2,934,542

2-(3,4-METHYLENEDIOXYPHENYL)-CYCLOPROPYLAMINES

Alfred Burger, Charlottesville, Va., assignor to Smith, Kline & French Laboratories, Philadelphia, Pa., a corporation of Pennsylvania No Drawing. Application September 22, 1958
Serial No. 762,275

6 Claims. (Cl. 260—340.5)

This invention relates to novel 2-(3,4-methylenedioxyphenyl)cyclopropylamines which have useful pharmacodynamic properties. More specifically, these compounds alter or modify the central nervous system and are useful as ataractic, antidepressant and hypotensive agents.

The novel 2-(3,4-methylenedioxyphenyl)cyclopropylamines of this invention are represented by the following general formula:

FORMULA 1

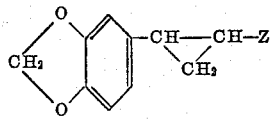

when Z represents amino, monomethylamino or dimethylamino.

An advantageous compound of this invention is trans-2-(3,4-methylenedioxyphenyl)cyclopropylamine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in an aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as cis-trans isomers due to the geometrical arrangement of the 3,4-methylenedioxyphenyl and amino moieties with respect to the cyclopropane ring, and further as d,l optical isomers. Unless otherwise specified in the specification and the accompanying claims, it is intended to include all isomers, particularly the separated cis or trans isomers and the resolved d- and l-cis or d- and l-trans isomers as well as the cis-trans mixtures of these isomers.

The novel 2-(3,4-methylenedioxyphenyl)cyclopropylamines of this invention are prepared according to the following synthetic scheme:

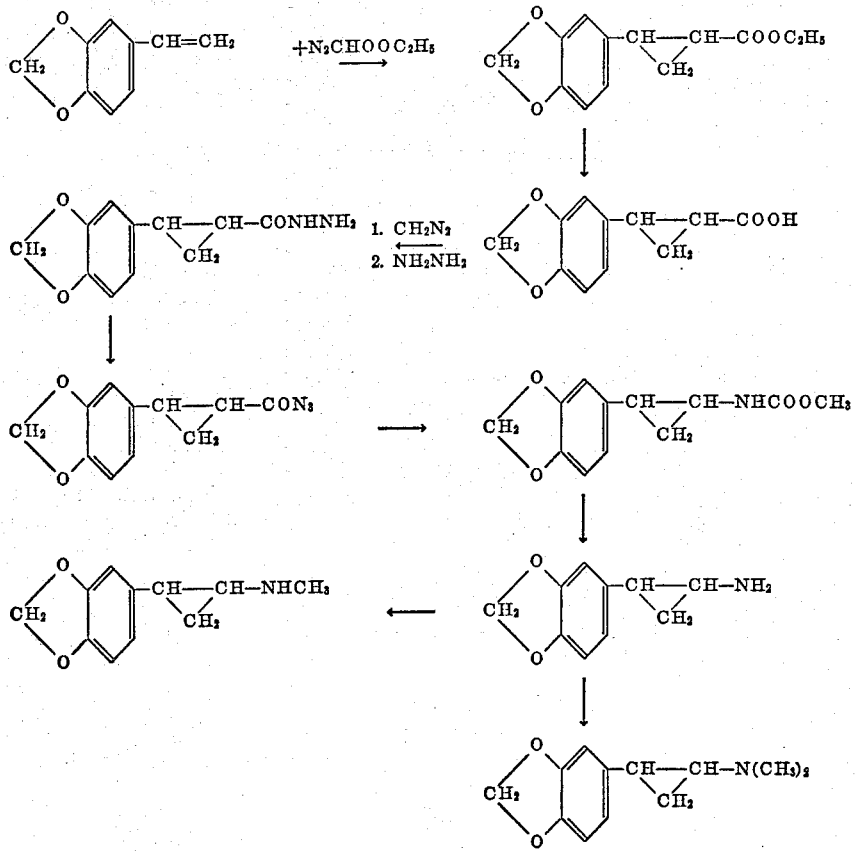

Thus, 3,4-methylenedioxystyrene is condensed with ethyl diazoacetate to yield ethyl 2-(3,4-methylenedioxyphenyl)- cyclopropanecarboxylate which is hydrolyzed with an aqueous alcoholic solution of an alkali metal hydroxide such as sodium or potassium hydroxide by refluxing for several hours. The solid hydrolysis product is fractionally recrystallized from water to separate the isomeric cis and trans carboxylic acids which are further reacted individually. The 2-(3,4-methylenedioxyphenyl)cyclopropanecarboxylic acid (cis or trans isomer) is treated with an ethereal solution of diazomethane and the thus formed methyl ester is refluxed with hydrazine hydrate in an alcoholic solution to give the hydrazide. The acid hydrazide is diazotized with hydrochloric acid and sodium nitrite and the resulting azide is thermally decomposed by refluxing in toluene solution with methanol according to the general Curtius rearrangement reaction to give the methyl urethan. The addition of methanol converts the intermediate isocyanate to the methyl urethan during the reaction. The urethan derivative is then hydrolyzed by refluxing for a long period of time for example up to 40 hours, with a saturated solution of barium hydroxide octahydrate in methanol to yield the 2-(3,4-methylenedioxyphenyl)cyclopropylamine. The free base is further converted to acid addition salts, for example the hydrochloride salt by reaction with ethereal hydrogen chloride, as outlined more fully above.

2 - (3,4 - methylenedioxyphenyl)cyclopropylmethylamine is prepared by refluxing an ethanolic solution of the free amine and benzaldehyde for several hours, heating the benzalamine derivative with methyl iodide in a sealed tube at from 100° C. to 150° C. and refluxing the reaction product with ethanol. The corresponding dimethylamino derivative is prepared by refluxing a mixture of the primary amine with aqueous formaldehyde and formic acid.

The methylamino derivative is alternatively prepared by other advantageous methods. Thus, the intermediate isocyanate obtained as above from the Curtius rearrangement of the azide is reduced by refluxing with lithium aluminum hydride in ether solution to give the N-methylcyclopropylamine. Also, the free 2-(3,4-methylenedioxyphenyl)cyclopropylamine is reacted with ethyl chloroformate to give the N-carbethoxy derivative which is reduced with lithium aluminum hydride to the N-methylamine.

The foregoing is a general description of the main synthetic routes in the preparation of 2-(3,4-methylenedioxyphenyl)cyclopropylamines. It will be readily apparent to one skilled in the art that variations of these procedures are possible. Of particular advantage as preparative procedures are the methods thoroughly discussed above, namely, conversion of the separated isomeric 2-(3,4-methylenedioxyphenyl)cyclopropanecarboxylic acids to the intermediate acid azides and subsequent rearrangement of the azides to the 2-(3,4-methylenedioxyphenyl)-cyclopropylamines.

The following examples are not limiting but are illustrative of the procedures for the preparation of compounds of this invention embraced by the general Formula 1.

Example 1

A mixture of 12.1 g. of 3,4-methylenedioxystyrene and 16.3 g. of ethyl diazoacetate is heated at 100° C. for two hours and then at 140–150° C. for three hours. The homogeneous mixture is distilled under reduced pressure and the fraction B.P. 141–192° C. at 0.6 mm., ethyl 2-(3,4-methylenedioxyphenyl)cyclopropanecarboxylate, is collected.

A mixture of 12.3 g. of ethyl 2-(3,4-methylenedioxyphenyl)cyclopropanecarboxylate, 10.5 g. of potassium hydroxide, 10.5 ml. of water and 45 ml. of 95% ethanol is refluxed for four hours. The solvents are removed in vacuo to give a solid residue. The residue is dissolved in 100 ml. of water and the solution is adjusted to pH 1 with concentrated hydrochloric acid, precipitating a crystalline product, M.P. 90–100° C. Recrystallization from water gives feathery needles of trans-2-(3,4-methylenedioxyphenyl)cyclopropanecarboxylic acid, M.P. 124.5–125° C.

The mother liquor (from above recrystallization) is concentrated in vacuo to give tan crystals, M.P. 144–146° C., which are recrystallized from boiling water to afford colorless prisms of cis-2-(3,4-methylenedioxyphenyl)-cyclopropanecarboxylic acid, M.P. 145–147° C.

Example 2

To a suspension of 15.1 g. of trans-2-(3,4-methylenedioxyphenyl)cyclopropanecarboxylic acid (prepared as in Example 1) in 200 ml. of absolute ether, is added, in portions, an ethereal solution of diazomethane until persistance of yellow color. After standing at room temperature for 24 hours, excess diazomethane is decomposed by the addition of ethereal hydrogen chloride. The ethereal solution is dried with anhydrous sodium sulfate and concentrated in vacuo to give the colorless trans-methyl 2-(3,4-methylenedioxyphenyl)cyclopropanecarboxylate.

The above methyl ester (17.6 g.) is dissolved in 35 ml. of absolute ethanol, 200 ml. of 100% hydrazine hydrate is added and the mixture is refluxed for five hours. After standing at room temperature for 20 hours, the pink solution is concentrated in vacuo. The residue is recrystallized from aqueous ethanol to give colorless crystals of trans-2-(3,4-methylenedioxyphenyl)cyclopropanecarboxylic acid hydrazide, M.P. 142–144° C.

Trans-2-(3,4 - methylenedioxyphenyl)cyclopropanecarboxylic acid hydrazide (13.6 g.) is dissolved in 300 ml. of 5% hydrochloric acid and a solution of 4.3 g. of sodium nitrite in 50 ml. of water is added slowly, while cooling so that the temperature does not exceed 0° C. The cooled solution is extracted thoroughly with toluene and the combined toluene extracts are dried with anhydrous sodium sulfate, and then concentrated to 500 ml. in vacuo. Methanol (300 ml.) is added to the toluene solution, the resulting solution is refluxed for five hours, and the solvents are removed in vacuo to afford an oil which recrystallized after the addition of one drop of methanol. The residue is recrystallized from ethanol to give trans-2-(3,4-methylenedioxyphenyl)cyclopropylmethyl urethan, M.P. 86.5–88° C.

Trans-2-(3,4-methylenedioxyphenyl)cyclopropylmethyl urethan (6.0 g.) and 300 ml. of a saturated solution of barium hydroxide octahydrate in methanol is heated at reflux for 36 hours. The mixture is cooled to 0° C., filtered and the filtrate concentrated to dryness in vacuo. The residue is extracted thoroughly with anhydrous ether. The ethereal solution is concentrated in vacuo to give an oily product which is taken up in 100 ml. of absolute ether. The ethereal solution is acidified with ethereal hydrogen chloride to precipitate a crystalline product. Recrystallization from methanol-ether gives trans-2-(3,4-methylenedioxyphenyl)cyclopropylamine hydrochloride, M.P. 206–208° C.

The oily free base obtained from above is also reacted with bismethylenesalicylic acid in ethyl acetate solution to yield trans-2-(3,4-methylenedioxyphenyl)cyclopropylamine bismethylenesalicylate.

Example 3

A suspension of 6.1 g. of cis-2-(3,4-methylenedioxyphenyl)cyclopropanecarboxylic acid (prepared as in Example 1) in 100 ml. of absolute ether is treated with an ethereal solution of diazomethane, the latter being added in portions until a yellow color persists. The solution is allowed to stand at room temperature for 24 hours and then the excess diazomethane is decomposed with ethereal hydrogen chloride. The dried ethereal solution is concentrated in vacuo to yield cis-methyl 2-(3,4-methylenedioxyphenyl)cyclopropanecarboxylate as a colorless oily residue.

The residual methyl ester is dissolved in 12 ml. of absolute ethanol and 85 ml. of 100% hydrazine hydrate is added. The resulting cloudy mixture is heated under reflux for five hours and the solvents removed in vacuo. The thick residual hydrazide is dissolved in acetone and the solution allowed to evaporate to dryness at room temperature. The residue is recrystallized from aqueous acetone to yield colorless crystals of the isopropylidene derivative of cis-2-(3,4-methylenedioxyphenyl)cyclopropanecarboxylic acid hydrazide, M.P. 129–130° C.

A solution of 1.6 g. of sodium nitrite in 10 ml. of water is added slowly to a solution of 5.0 g. of the oily hydrazide prepared above in 200 ml. of 2.5% hydrochloric acid, with the temperature maintained below 0° C. The red oily product is extracted with ether and the dried ether extracts evaporated in vacuo. The residue is dissolved in 300 ml. of absolute toluene and the solution refluxed until no more nitrogen is evolved. Absolute methanol (200 ml.) is then added and the solution heated under reflux for five hours. The solvents are distilled in vacuo and the residue recrystallized from dilute methanol to give cis-2-(3,4-methylenedioxyphenyl)cyclopropylmethyl urethan as colorless crystals, M.P. 97–99° C.

Cis-2-(3,4-methylenedioxyphenyl)cyclopropylmethyl urethan (7.5 g.) and 375 ml. of a saturated methanolic solution of barium hydroxide octahydrate is refluxed for 36 hours. The reaction mixture cooled to 0° C. is filtered and the filtrate concentrated to dryness in vacuo. The residue is extracted thoroughly with anhydrous ether and the extracts evaporated in vacuo to leave an oily residue. The residue is dissolved in absolute ether and the ethereal solution treated with anhydrous hydrogen bromide gas to yield cis-2-(3,4-methylenedioxyphenyl)cyclopropylamine hydrobromide.

The above residual free base is also converted to the maleate salt by dissolving the cis-2-(3,4-methylenedioxyphenyl)cyclopropylamine in ethyl acetate and treating the solution with an ethyl acetate solution of maleic acid.

*Example 4*

A solution of 6.7 g. of trans-2-(3,4-methylenedioxyphenyl)cyclopropylamine (prepared as in Example 2) and 5.8 g. of benzaldehyde in 15 ml. of absolute ethanol is refluxed for three hours. The solvent is removed in vacuo and the benzal derivative distilled.

A mixture of 8.0 g. of trans-2-(3,4-methylenedioxyphenyl)cyclopropylbenzalamine and 10.3 g. of methyl iodide is heated in a sealed tube at 100° C. for eight hours. The reaction product is heated with 100 ml. of 95% ethanol for four hours, the solvent removed in vacuo, the base liberated with 40% potassium hydroxide solution and extracted with ether. The dried ether extract is evaporated and the residue distilled to give trans-2-(3,4-methylenedioxyphenyl)cyclopropylmethylamine.

An ethereal solution of the free base treated with anhydrous hydrogen chloride gas furnishes the hydrochloride salt.

Similarly, following the above procedure, the cis primary amine prepared as in Example 3 is converted to cis-2-(3,4-methylenedioxyphenyl)cyclopropylmethylamine.

*Example 5*

To a cooled solution of 6.7 g. of cis-2-(3,4-methylenedioxyphenyl)cyclopropylamine (prepared as in Example 3) in 17.7 g. of 90% formic acid, is added 13.7 g. of 40% aqueous formaldehyde solution and the mixture heated at reflux for 18 hours. The cooled reaction mixture is treated with 7.5 ml. of concentrated hydrochloric acid and the solution evaporated in vacuo. The residue is made alkaline with 50% potassium hydroxide solution and the free base extracted with ether. The dried ether extracts are distilled to yield cis-2-(3,4-methylenedioxyphenyl)cyclopropyldimethylamine.

The free base is treated with citric acid in an acetone solution to give the citrate salt.

By following the procedure outlined above, the corresponding trans primary amine (prepared as in Example 2) is converted to trans-2-(3,4-methylenedioxyphenyl)cyclopropyldimethylamine.

What is claimed is:

1. A chemical compound of the class consisting of a free base and its nontoxic, pharmaceutically acceptable acid addition salts, said free base having the formula:

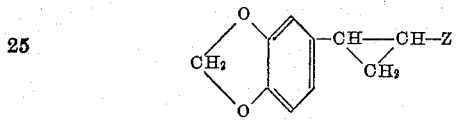

in which Z is a member selected from the group consisting of amino, monomethylamino and dimethylamino.

2. The chemical compound having the structural formula:

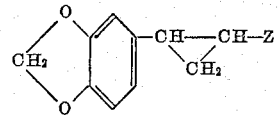

3. Trans-2-(3,4-methylenedioxyphenyl)cyclopropylamine.

4. The chemical compound having the structural formula:

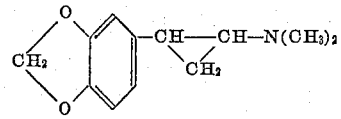

5. Trans-2-(3,4-methylenedioxyphenyl)cyclopropyldimethylamine.

6. The chemical compound having the structural formula:

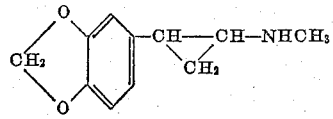

No references cited.